United States Patent
Khorasgani et al.

(10) Patent No.: US 11,544,134 B2
(45) Date of Patent: Jan. 3, 2023

(54) SYSTEM AND METHOD FOR DATA-DRIVEN ANALYTICAL REDUNDANCY RELATIONSHIPS GENERATION FOR EARLY FAULT DETECTION AND ISOLATION WITH LIMITED DATA

(71) Applicant: Hitachi, Ltd., Tokyo (JP)

(72) Inventors: Hamed Khorasgani, San Jose, CA (US); Ahmed Khairy Farahat, Santa Clara, CA (US); Chetan Gupta, San Mateo, CA (US); Wei Huang, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/990,662

(22) Filed: Aug. 11, 2020

(65) Prior Publication Data
US 2022/0050736 A1 Feb. 17, 2022

(51) Int. Cl.
*G06F 11/07* (2006.01)
*G06F 11/22* (2006.01)
*G06N 5/04* (2006.01)
*G06N 20/00* (2019.01)

(52) U.S. Cl.
CPC .......... *G06F 11/079* (2013.01); *G06F 11/073* (2013.01); *G06F 11/0751* (2013.01); *G06F 11/2263* (2013.01); *G06N 5/04* (2013.01); *G06N 20/00* (2019.01)

(58) Field of Classification Search
CPC .. G06F 11/079; G06F 11/0751; G06F 11/073; G06F 11/2263; G06N 20/00; G06N 5/04
See application file for complete search history.

(56) References Cited

U.S. PATENT DOCUMENTS

| | | | | |
|---|---|---|---|---|
| 10,860,405 | B1* | 12/2020 | Zonneveld | G06F 11/0709 |
| 2008/0015814 | A1* | 1/2008 | Harvey | G05B 23/024 |
| | | | | 702/179 |
| 2015/0370660 | A1* | 12/2015 | Pershin | G06F 11/0772 |
| | | | | 714/4.11 |

(Continued)

OTHER PUBLICATIONS

Isermann, R. et al."Trends in the application of model-based fault detection and diagnosis of technical processes." Control Engineering Practice, 1997, pp. 709-719, vol. 5, No. 5.

(Continued)

*Primary Examiner* — Jonathan D Gibson
(74) *Attorney, Agent, or Firm* — Procopio, Cory, Hargreaves & Savitch LLP (57) ABSTRACT

Example implementations described herein involve a new data-driven analytical redundancy relationship (ARR) generation for fault detection and isolation. The proposed solution uses historical data during normal operation to extract the data-driven ARRs among sensor measurements, and then uses them for fault detection and isolation. The proposed solution thereby does not need to rely on the system model, can detect and isolate more faults than traditional data-driven methods, can work when the system is not fully observable, and does not rely on a vast amount of historical fault data, which can save on memory storage or database storage. The proposed solution can thereby be practical in many real cases where there are data limitations.

18 Claims, 8 Drawing Sheets

(56) References Cited

U.S. PATENT DOCUMENTS

| | | | | |
|---|---|---|---|---|
| 2016/0098314 A1* | 4/2016 | Talafa | ............... | G06F 11/0751 714/37 |
| 2016/0203036 A1* | 7/2016 | Mezic | ............... | G06F 11/079 714/819 |
| 2016/0371137 A1* | 12/2016 | Zhao | ............... | G06N 20/00 |
| 2018/0308004 A1* | 10/2018 | Kalia | ............... | G06F 11/0751 |
| 2018/0308011 A1* | 10/2018 | Kalia | ............... | G06F 11/073 |
| 2019/0370610 A1* | 12/2019 | Batoukov | ............... | G06N 20/20 |
| 2020/0302226 A1* | 9/2020 | El Ferik | ............... | G06K 9/6223 |
| 2020/0310897 A1* | 10/2020 | Wei | ............... | G06F 11/0733 |
| 2021/0049059 A1* | 2/2021 | Bisa | ............... | G06F 11/0793 |
| 2021/0248022 A1* | 8/2021 | Zhuang | ............... | G06F 11/0751 |

OTHER PUBLICATIONS

Biswas, G. et al., "A Robust Method For Hybrid Diagnosis Of Complex Systems," In Proceedings of the 5th Symposium on Fault Detection, Supervision and Safety for Technical Processes, 2003, pp. 1125-1131.

Mosterman, P. J. et al. "Diagnosis Of Continuous Valued Systems In Transient Operating Regions" IEEE Transactions On Systems, Man, And Cybernetics—Part A: Systems And Humans, Nov. 1999, pp. 554-565, vol. 29, No. 6.

Bregon, A. et al. "A Common Framework For Compilation Techniques Applied Applied To Diagnosis Of Linear Dynamic Systems" IEEE Transactions On Systems, Man, And Cybernetics: Systems, Jul. 2014, vol. 44, No. 7, (15 pages).

Alcorta-Garcia, E. et al. "Deterministic Nonlinear Observer-Based Approaches To Fault Diagnosis : A Survey" Control Engineering Practice, Mar. 1997, 663-670, vol. 5, No. 5.

Salfner, F. et al. "A Survey Of Online Failure Prediction Methods" ACM Computing Surveys (CSUR), 2010, pp. 1-68, vol. 42, No. 3.

Fran, P. M. et al. "Frequency Domain Approach To Optimally Robust Residual Generation And Evaluation For Model-Based Fault Diagnosis," Automatica, 1994, pp. 789-804, vol. 30, No. 5.

Gertler, J. "Fault Detection And Diagnosis In Engineering Systems" CRC press, 1998 (35 pages).

Venkatasubramanian, V. et al. "A Review Of Process Fault Detection And Diagnosis: Part Iii: Process History Based Methods" Computers and Chemical Engineering, 2003, pp. 327-346, vol. 27, No. 3.

Khorasgani, H. "A Methodology For Monitoring Smart Buildings With Incomplete Models" Applied Soft Computing, Jun. 11, 2018, pp. 396-406, vol. 71.

* cited by examiner

SYSTEM AND METHOD FOR DATA-DRIVEN ANALYTICAL REDUNDANCY RELATIONSHIPS GENERATION FOR EARLY FAULT DETECTION AND ISOLATION WITH LIMITED DATA

BACKGROUND

Field

The present disclosure is generally directed to fault detection, and more specifically, to generation of data-driven analytical redundancy relationships for early fault detection and isolation with limited data.

Related Art

Deviations of system characteristics and parameters from standard conditions are referred to as faults in the system. Faults can put the equipment operators at risk, disrupt the manufacturing processes and cost industries significant amounts of money. Fault detection determines the occurrence of a fault and the fault occurrence time in the system. Subsequently, fault isolation determines the type and location of the detected fault. Timely Fault Detection and Isolation (FDI) can be critical for system operator safety, and can help to prevent abnormal event progression and reduce downtime and productivity losses.

Figure 1:
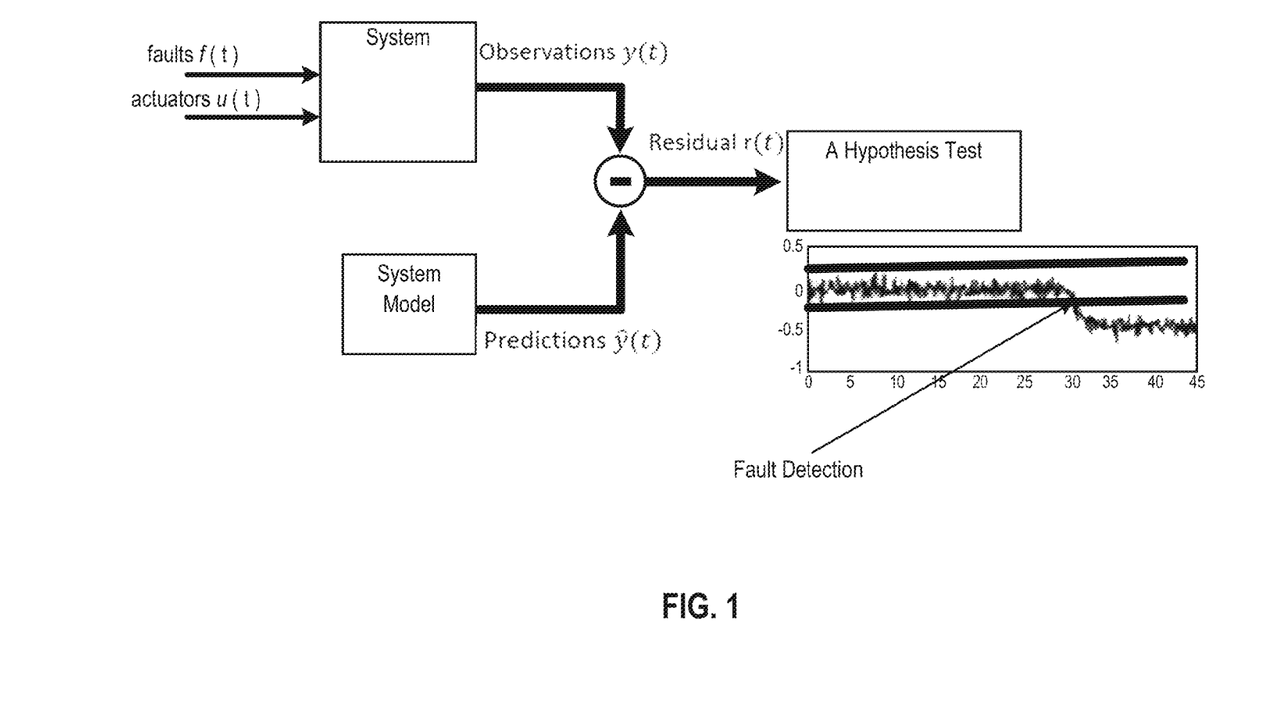
FIG. 1 illustrates an example schematic for model-based fault detection and isolation.

Traditionally, prognostics and health monitoring engineers use system models to monitor systems and generate alarms when the system deviates from its normal operation. These related art methods compare the system outputs to the model outputs to calculate the deviations from normal conditions. The differences between the system outputs and the model outputs are called residuals. Residuals are the key components in model-based FDI. To make an FDI method robust to noise and uncertainties, typically, a hypothesis test such as Z-test is used to determine whether a residual deviation is statistically significant. FIG. 1 illustrates an example schematic for model-based fault detection and isolation.

Figure 2:
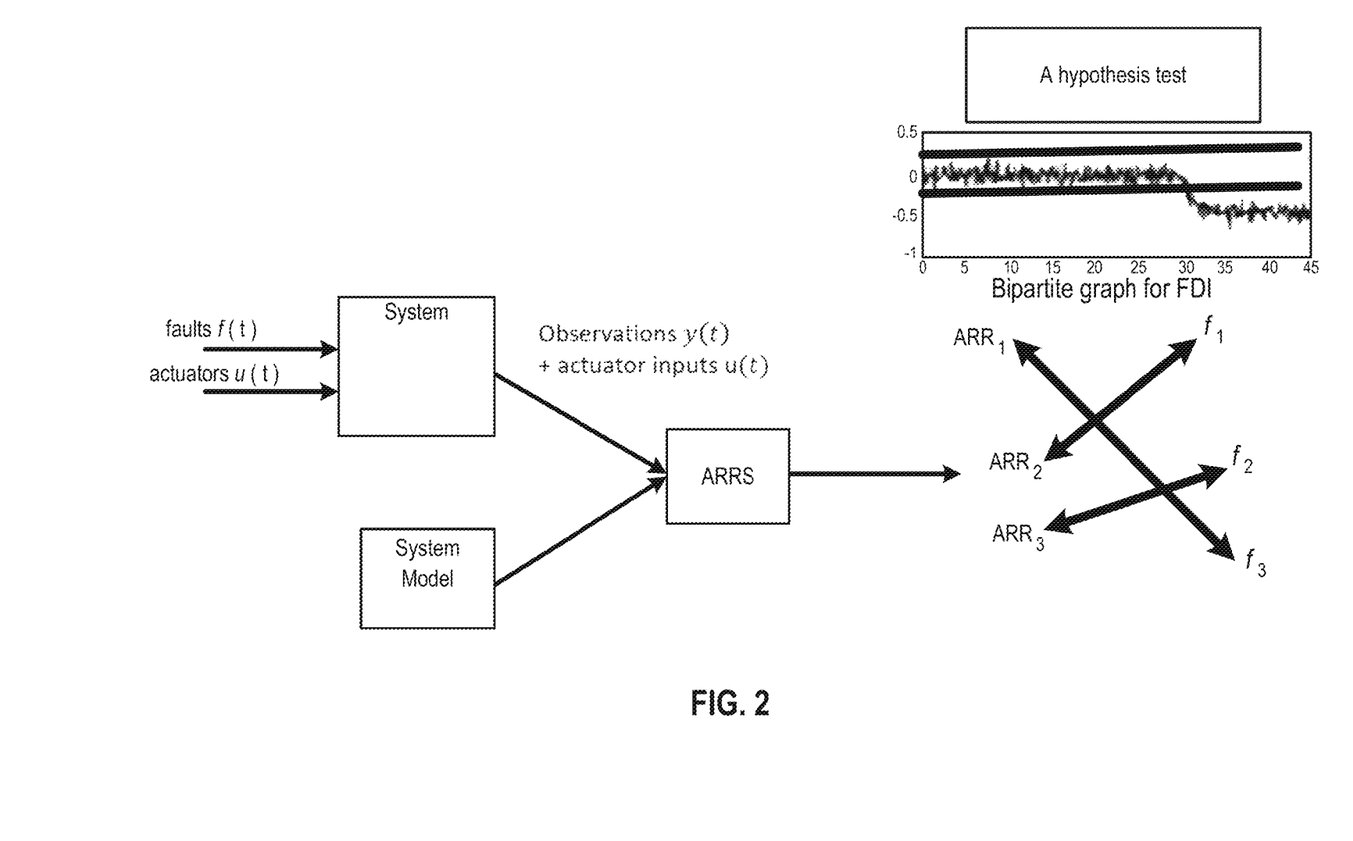
FIG. 2 represents a model-based fault detection and isolation scheme using ARRs.

In the related art, there have been implementations which expanded model-based fault detection and isolation to detect and isolate more faults by using a broader definition for residuals and developing more sophisticated approaches to derive the residuals. A system model is a set of mathematical equations which represent the normal behavior of the system. A residual in the broader term is defined as an analytical redundancy relationship (ARR) in system equations. In this definition, a residual is not necessarily the difference between the model output and the system output; instead any analytical relationship derived from the redundancies in the system is a residual. To make a diagnoser robust to noise and uncertainties, typically, a hypothesis test such as Z-test is used to determine if an ARR deviation is statistically significant. In the last step, a fault isolation algorithm uses a decision logic to generate possible fault candidates based on the hypothesis tests outputs (alarms). FIG. 2 represents a model-based fault detection and isolation scheme using ARRs.

This expansion has several advantages. 1) It is been shown that by using the analytical redundancy approach, users can detect and isolate faults which were not previously detectable or isolable. 2) To design diagnosers using analytical redundancy approach, users do not need the system complete model and a subset of equations may be adequate to detect and isolate the faults. 3) It is possible to design more robust residuals using analytical redundancy approaches because they typically include much fewer parameters, and measurements compared to the entire model.

Model-based methods are computationally efficient. Moreover, it is easy to understand and interpret the diagnosis results of these approaches. However, for complex systems, developing reliable models can be expensive, and it is often infeasible to derive a sufficiently accurate model for the system that generates correct diagnosis results. When the system model is not available, data-driven solutions can be used for fault detection and isolation. Instead of relying on the system models, data-driven solutions use system historical data and machine learning techniques for FDI. There are two main data-driven fault detection and isolation approaches: 1) classifier method and 2) system model methods.

Figure 3:
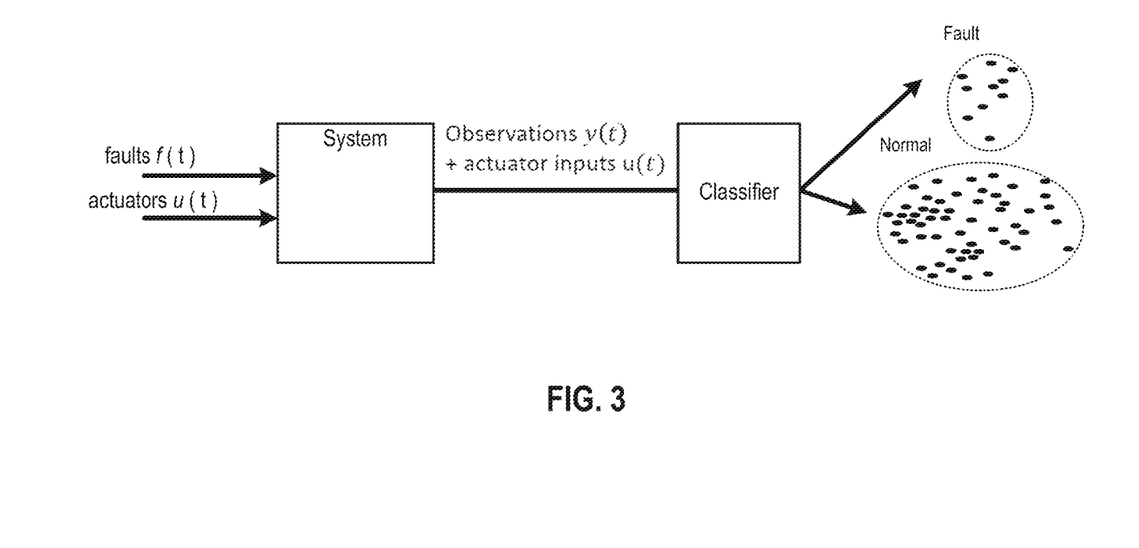
FIG. 3 illustrates an example of a classifier approach for data-driven fault detection.

FIG. 3 illustrates an example of a classifier approach for data-driven fault detection. The classifier approaches use both normal and fault data to train a classifier which classify each sample point (or each time window which includes several successive samples points) as normal or fault modes.

Figure 4:
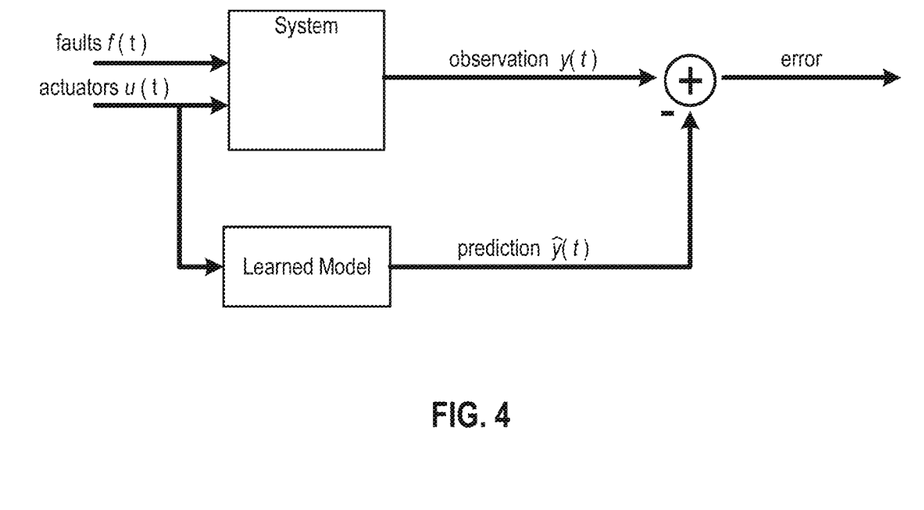
FIG. 4 illustrates an example of a data-driven system model using fault detection methods.

FIG. 4 illustrates an example of a system model approach for data-driven fault detection. When fault data is not available, system model methods are reliable alternatives. These methods use normal data to learn system model and apply the trained model to compute expected value of the systems. When the expected value does not match the current value, it can be concluded that the system is not behaving as expected and therefore, may be in a fault mode. Unlike classifier methods, system model methods do not require fault data and therefore, are more practical.

SUMMARY

Example implementations described herein are directed to a new data-driven ARR generation for fault detection and isolation as an improved version of system model methods. Similar to the model-based approaches which use the system physical equations for ARR generation, example implementations described herein utilize historical data during normal operation to extract redundancies among sensor measurements. In the present disclosure, these redundancies are referred to as data-driven ARR. The derived data-driven ARRs are used for fault detection and isolation. Like other data-driven methods, the proposed solution does not rely on the system model. Moreover, the proposed solution can detect and isolate more faults than traditional model learning methods, can work when the system is not fully observable, and does not rely on vast amounts of historical fault data. This makes the proposed approach practical in many real cases in which there are data limitations.

A residual is an analytical redundancy relation between known variables. In the present disclosure, the example implementations described herein involve a new method to learn the redundancies between the variables from data, referred to as data-driven ARRs.

Example implementations involve 1) exhaustive search or 2) forward feature selection to select the minimal sets of variables which can predict the value of each variable in the dataset. Toward this end, for each target variable, $v_t$ in the set of variables, example implementations parse through the dataset and add variables which can improve the $v_t$ estimation score significantly to the list of selected variables, $V_t$.

For each target variable, $v_t$, the selected set of variables are used to learn a model $\hat{v}_t = \text{model}(V_t)$. The model can be linear regression, neural network, support vector regression, or any other regression method based on the application. For dynamic systems with delays, example implementations can involve recurrent neural network (RNN) such as Long short-term memory (LSTM) to capture the delay in the system.

Each target variable and its selected variables, $v_t+R_{v_t}$, can generate a data-driven ARR. The data-driven ARR for variable $\hat{v}_t$ is $r_{v_t}=v_t-\text{model}(V_t)$.

The normal data is used to learn normal thresholds for each data-driven ARR for example: $t_{x_{lower}}=\mu(r_v)-3\sigma(r_v)$, and $t_{x_{upper}}=\mu(r_v)+3\sigma(r_v)$, where $\mu(r_v)$ represents the data-driven ARR average, and $3\sigma(r_v)$ represents the data-driven ARR three standard deviations. An ARR outside of its normal threshold bounds triggers an alarm.

Fault data is also used to select best data-driven ARR to detect each fault and isolate each pair of faults. Then, a bipolar diagnosis graph is generated between faults and alarms and use this graph for FDI.

Aspects of the present disclosure can involve a method for a database of data involving a plurality of variables, the method involving, for each of the plurality of variables, extracting one or more minimal analytical redundancy relationships (ARRs) for the each of the plurality of variables from a subset of other ones of the plurality of variables; deriving one residual for each of the one or more minimal ARRs; determining one or more boundaries of normal data for the each of the one or more ARRs from the database of the data; and determining a subset of the one or more residuals based on the one or more boundaries of the normal data to facilitate fault detection.

Aspects of the present disclosure can involve a computer program, storing instructions for management for a database of data involving a plurality of variables, the instructions which, when executed by one or more processors, execute a process involving, for each of the plurality of variables, extracting one or more minimal analytical redundancy relationships (ARRs) for the each of the plurality of variables from a subset of other ones of the plurality of variables; deriving one residual for each of the one or more minimal ARRs; determining one or more boundaries of normal data for the each of the one or more ARRs from the database of the data; and determining a subset of the one or more residuals based on the one or more boundaries of the normal data to facilitate fault detection. Depending on the desired implementation, the computer program can be stored on a non-transitory computer readable medium.

Aspects of the present disclosure can involve a system for a database of data involving a plurality of variables, the system involving, for each of the plurality of variables, means for extracting one or more minimal analytical redundancy relationships (ARRs) for the each of the plurality of variables from a subset of other ones of the plurality of variables; means for deriving one residual for each of the one or more minimal ARRs; means for determining one or more boundaries of normal data for the each of the one or more ARRs from the database of the data; and means for determining a subset of the one or more residuals based on the one or more boundaries of the normal data to facilitate fault detection.

Aspects of the present disclosure can involve a management apparatus configured to manage a database of data involving a plurality of variables, the management apparatus involving a processor, configured to, for each of the plurality of variables, extract one or more minimal analytical redundancy relationships (ARRs) for the each of the plurality of variables from a subset of other ones of the plurality of variables; derive one residual for each of the one or more minimal ARRs; determine one or more boundaries of normal data for the each of the one or more ARRs from the database of the data; and determine a subset of the one or more residuals based on the one or more boundaries of the normal data to facilitate fault detection.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The present disclosure is based on a determination that learning the system model from the data is not enough for accurate FDI, and that better results can be achieved by learning the residuals for the following reasons. Firstly, model learning approaches learn a model that maps system input to the system output. In many cases, the system input and output are not obvious. Therefore, it is not trivial to learn the system overall model. In the example implementations of the residual generation method, variables are not defined as input or output. Instead, the example implementations determine a minimal set of variables which can learn each target variable. Secondly, in many cases, there may not be access to all the measurements. Therefore, the system model cannot be learned. However, residuals can be learnable as they are local sets of redundant variables. Thirdly, in many cases it is challenging to isolate different faults in model learning methods as they all affect the system output. Using the residuals, it can be possible to better isolate different faults. This is because of the local nature of the residuals. Several faults can affect different sensors. By using a minimal set of sensors in each residual, example implementations increase the likelihood of having a residual sensitive to a fault and not sensitive to the other ones. This information can be used for fault isolation.

Instead of using the system physical model for residual generation, historical data is used during normal operation to extract redundancies among sensor measurements. These redundancies are referred to as data-driven ARRs. The data-driven ARRs are then used for FDI. Like data-driven system model FDI methods, the example implementations do not require the system model and do not rely on a vast amount of historical fault data. However, the example implementations can detect and isolate more faults than traditional model learning methods and can work when the system is not fully observable. These makes the proposed approach practical in many real cases where there are data limitations.

In the following the fault detection and isolation problem, data-driven ARRs, and detectable and isolable faults are defined using the proposed data-driven method. These definitions help formulate the data-driven ARR generation problem in a systematic way.

Definition 1 (Fault): An deviation of a system from standard condition is referred to as a fault. Early fault detection and isolation (FDI) is critical for operator safety, and timely maintenance recommendations which can save industries significant costs.

Definition 2 (FDI): Fault detection determines the occurrence of a fault and the fault occurrence time in the system. In the next step, fault isolation pinpoints the type and location of the occurred fault in the system.

Proposing a new method for data-driven ARRs is the focus of the present disclosure. Define data-driven ARRs as follows:

Definition 3 (Data-driven ARR): A set of variables in the dataset, $V_t$ plus a target variable $v_t$ where $v_t \notin V_t$ represent a data-driven ARR if there exists a machine learning model that can estimate $v_t$ using $V_t$ with a given accuracy ($\epsilon$), $\hat{v}_t$=model ($V_t$) where $\|v_t-\hat{v}_t\|<\epsilon$. The data-driven ARR for variable $v_t$ is $r_{v_t}=v_t-\hat{v}_t$.

In model-based analytical redundancy methods, minimal ARRs are used as the smallest subset of equations which include redundancies for ARR generation. Minimal ARRs are more likely to be useful in fault isolations. Moreover, they tend to be less sensitive in model uncertainties as they include fewer parameters and measurements. Define the minimal data-driven ARRs as:

Definition 4 (Minimal data-driven ARR): A data-driven ARR, $r=(v_t, V_t)$ is a minimal ARR if no subset of $V_t$ creates a data-driven ARR with the target variable $v_t$.

For model based FDI methods, the present disclosure defines a fault as detectable when there exists a residual sensitive to the fault and at the same time invariant or at least robust to uncertainties and noise in the system. Similarly, the present disclosure defines a detectable fault using data-driven ARRs as follows:

Definition 5 (Detectable fault): A fault $f_i$ is detectable if there exists a data-driven ARR, $r=(v_t, V_t)$, in the data set where there is statistically significant difference between $v_t$–model($V_t$) when fault $f_i$ occurs and when it does not (normal operation).

For model based FDI methods, the present disclosure defines a fault $f_i$ as isolable from another fault $f_j$ when there exists a residual sensitive to $f_i$ and at the same time insensitive to $f_j$ and other uncertainties in the system. Similarly, example implementations define isolable faults using data-driven ARRs as Definition 6 (Isolable faults): Fault $f_i$ is isolable from fault $f_j$ if there exists a data-driven ARR, $r=(v_t, V_t)$, in the data set where there is significant statistical difference between $v_t$–model($V_t$) when fault $f_i$ occurs and when fault $f_j$ occurs.

Using these definitions, the example implementations develop a method to generate data-driven ARRs and design a data-driven diagnoser for FDI in the next section.

In the following disclosure, there are proposed two algorithms for data-driven ARR generation, and two methods to address delay in dynamic systems. Example implementations then present a simple approach to design diagnoser to clarify the solution.

Data-Driven ARR Generation

In the previous section, data-driven ARR is defined as a set of variables in the dataset, $V_t$, plus a target variable $v_t$ where $V_t$ can be used to estimate $v_t$. To find these set of variables for each target variable, two methods can be utilized: 1) exhaustive search, and 2) forward feature selection. The exhaustive search algorithm can find several ARRs for each target variable. This method can be helpful when there are several faults in the system and more ARRs can help isolating faults from each other. However, the exhaustive search is computationally expensive. The feature selection algorithm is an efficient alternative solution. The feature selection method finds at most one ARR per target variable. Even though this may lead to missing some ARRs, the feature selection algorithm should be sufficient for most applications.

Exhaustive Search

In the exhaustive search method, for each target variable $v_t$ all the minimal set of variables are determined that can estimate $v_t$. Each of these variable groups plus $v_t$ is a minimal data-driven ARR. A tree search algorithm is used to find these residuals.

For each target variable $v_t$, start with all the variables, and see if they can estimate $v_t$ accurately (there exists a machine learning model that can estimate $v_t$ using the variables with the required accuracy). If they cannot, it means there is no residual in the dataset for $v_t$ as even all the variables cannot estimate $v_t$. In this case, the process moves to the next variable.

If they can, all the variables plus $v_t$ create an ARR. However, it is still uncertain as to whether this ARR is minimal. For each variable in $V_t$, the variable is thereby removed and a check is made to determine if the subset still can estimate $v_t$, if no subset of $V_t$ can estimate $v_t$, it means $V_t$ plus $v_t$ is a minimal ARR. This ARR is thereby saved, and the process moves to the next variable.

Otherwise, the ARR is not minimal. In this case, the process is repeated for every subset of variables that can estimate $v_t$, until all the minimal ARRs are found. In more detail, for each variable $v \in V$, the process removes $v$ and checks if V/v (V minus v) plus $v_t$ is an ARR. If no, then there is no ARR in V/v for $v_t$, otherwise, a check is done to determine if it is also minimal. If the data-driven ARR is minimal, V/v plus $v_t$ is saved as a new ARR. Else, keep removing variables until a minimal ARR is reached. After finding all the minimal ARRs for $v_t$, the next variable is processed.

Note that to check if a set of variables can estimate the target variable, we use the selected set of variables to learn a model $\hat{x}$=model($R_x$) and compute an estimation score for the learned model. The model can be linear regression, neural network, support vector regression or any other regression model based on the application.

Forward Feature Selection

The exhaustive search finds all the minimal data-driven ARRs in the dataset and therefore, it is guaranteed to achieve maximum detectability and isolability. However, this algorithm is computationally expensive and may not be practical for systems with large number of measurements. To address this problem, the present disclosure proposes a forward feature selection algorithm as an alternative solution. The forward feature selection is used to select the minimum number of variables which can estimate the value of each variable in the dataset.

For each target variable, $v_t$, in the set of variables, the example implementations parse the dataset and measure the estimation score for each variable in the dataset. The variable with the highest estimation score is added as the first variable in the residual list, $R_x$.

All the remained variables are then parsed, and add the variable which improves the estimation score most to the residual list, $R_x$. The process stops when the required accuracy score, error $<\epsilon$, is reached where $\hat{v}_t$=model $(R_x)$ and $\|v_t-\hat{v}_t\|$=error. If the required accuracy score is not reached, then the process concludes there is no residual for $v_t$. At the end, the example implementations go through all the variables selected for each residual and remove the ones which have no significant contribution to the overall set of variables.

The data-driven ARR for variable $v_t$ is $r_{v_t}=v_t-\text{model}(R_{v_t})$. Just because this relationship holds, does not mean that $r_{v_t}$ is useful in fault detection and isolation. In the next subsection, a subset of generated residuals that are useful for fault detection and isolation are determined. Toward this end, statistical analysis such as Z-test is used to see if the generated residuals are statistically different with and without faults and therefore, can be used for FDI.

Selecting Useful ARRs

Not all the analytical redundancies (data-driven ARRs) are useful for fault detection and isolation. For each fault mode in the system, all the ARRs are parsed to select the best set of ARRs to detect the fault. Different metrics can be used to measure the performance of ARRs in fault detection and isolation. For the sake of demonstration, the following approach is used:

For each ARR, the normal data is used to find its 3 sigma bounds: $t_{normal_{lower}}=\mu(r_n)-3\sigma(r_n)$, and $t_{normal_{upper}}=\mu(r_v)+3\sigma(r_v)$. Then the fault data is used to find its 3 sigma bounds: $t_{fault_{lower}}=\mu(r_f)-3\sigma(r_f)$, and $t_{fault_{upper}}=\mu(r_f)+3\sigma(r_f)$. Select a subset of residuals that their bounds for f do not intersect with normal bounds as the candidates for detecting the fault. The selected residuals can also be used to isolate faults. In the following description, a diagnoser design is described in detail for clarification.

Delays in the System

Figure 5:
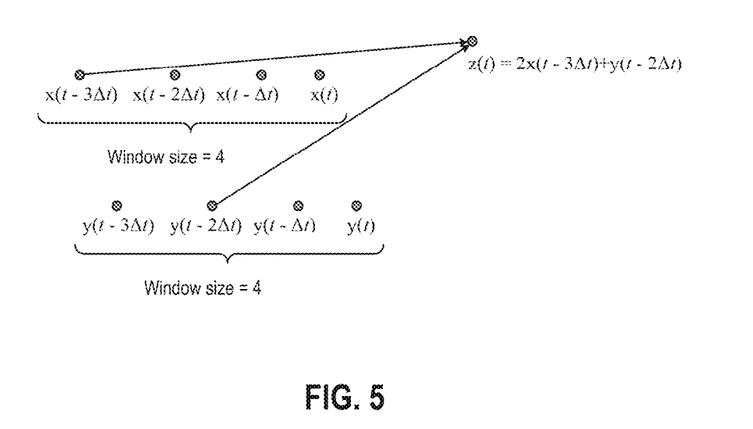
FIG. 5 shows an example where variable z is a function of variables x, and y, and there are delays in the system in accordance with an example implementation.

In many cases the variables are correlated, and they represent redundancies in the system. However, because of delays in dynamic systems (for example the time it takes for heat to transfer through materials), such variables cannot be used to estimate the target variable if only the current sample values are used. The present disclosure proposes two solutions to this problem 1) using window size, and 2) using recurrent neural network (RNN). By using a window of last n samples for each variable, the model can capture delays in the system and generate data-driven ARRs for systems with delays. FIG. 5 shows an example where variable z is a function of variables x, and y, in accordance with an example implementation.

However, because of the delay in the system the effect of variable x on z appears with $3\Delta t$ and the effect of variable y appears with $2\Delta t$ delay. As it is shown in FIG. 5, this residual can be captured by using a window of size 4 for each variable when estimating the target variable. The window size is a meta parameter which users can define based on their knowledge of the system.

In the second approach, sequence models are used such as recurrent neural networks (RNNs) and long-short term memory (LSTM) to address delay. RNNs include a memory loop in their structure and therefore, they can use information from previous samples in estimating the target variable. RNNs have been used in many applications such as speech recognition, and language modeling in recent years. Long Short-Term Memory networks (LSTMs) are a subclass of RNNs, which are capable of learning long-term dependencies as well. When long-term delays exist in the system, and long-term dependencies are expected among the variables, LSTM is used to learn the residuals. However, training LSTM networks could be computationally expensive, and the users should consider computational limitations when selecting this approach.

Designing a Diagnoser

After generating the set of data-driven ARRs, R= {r_1, . . . , r_n}, these ARRs are used for fault detection and isolation. Different hypothesis tests such as t-test, z-test, f-test, and chi-square test can be used to determine if an ARR has significantly deviated from zero. Designing a hypothesis test is critical to avoid false alarms in the presence of noise. In the following example, the Z-test is applied. Z-test algorithm uses last N2 ARR values to compute the mean value of the ARR distribution (assumed to be a normal distribution):

$$\mu_r(k) = \frac{1}{N_2} \sum_{i=k-N_2+1}^{k} r_i$$

The last $N_1$ samples (typically, $N_1 \gg N_2$) to compute the variance:

$$\sigma_r^2(k) = \frac{1}{N_1-1} \sum_{i=k-N_1+1}^{k} (r_i - \mu_r(k))^2$$

The confidence level for the Z-test, $\alpha$, determines the bounds, z−, and z+, and, therefore, the sensitivity of the ARRs. $P(z-<(r(k)-\mu r(k))<z+)=1-\alpha$.

The Z-test is implemented as follows:

$$r_b = \begin{bmatrix} 0 & z-<(k)-\mu r(k)<z+ \\ 1 & \text{otherwise} \end{bmatrix}$$

where $r_b$ represents the alarm derived from ARR, r. Generally, the Z-test is applied when there are large sample sizes (say, n>30). When a smaller sample size is involved, other hypothesis tests such as T-test can be used.

The hypothesis test outputs can be used for fault detection. As an example, consider the mining crusher system shown in FIG. 6. The system works as follows. The concave and mantle together form the crushing chambers. As the mantle rotates, the mantle-concave distance varies periodically. When the mantle-concave distance increases, the rocks fall down. When the distance decreases, the rocks get crushed. The system is designed to crush rocks and cannot crush metals. A piece of metal in the system can break the crusher. An early fault detection can help the operators to stop and clean the system before a permanent damage to the crusher.

Figure 6:
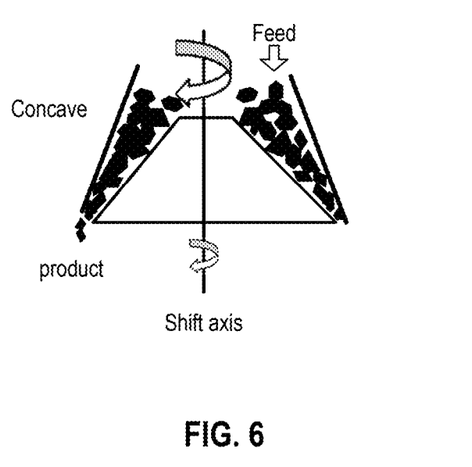
FIG. 6 illustrates an example mining crusher system.

It is challenging and expensive to develop sufficiently accurate model for the system that generates correct diagnosis results. Therefore, a data-driven solution is used for fault detection. On the other hand, these faults are rare and typically there is only access to a couple of fault scenarios. The proposed data-driven solution could generate couple of data-driven ARRs using system target variables such as crusher oil temperature, and power consumption to detect this fault early on.

Figure 7:
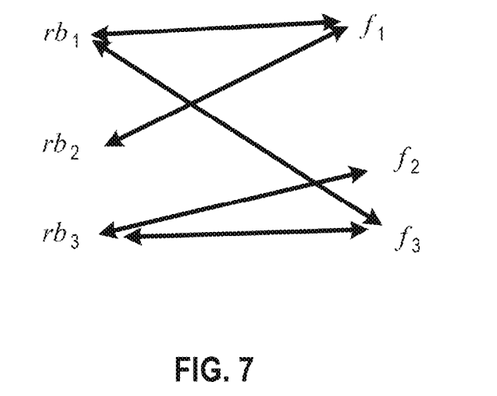
FIG. 7 illustrates a diagnosis reference model for a system with three alarms, rb1, rb2, and rb3, and three fault modes, f1, f2, and f3.

Model-based FDI method uses diagnosis reference model for fault isolation. The diagnosis reference model is a bipartite graph that captures the causal relations between residuals and potential faults. In the related art, these graphs are used to design residual based diagnosers for complex systems with several interacting subsystems where degradation and faults in one component may affect other components. For example, FIG. 7 illustrates a diagnosis reference model for a system with three alarms, rb1, rb2, and rb3, and three fault modes, f1, f2, and f3.

Given the set of fault modes in the system, F, each fault mode f∈F takes a binary value, where 0 means the fault mode is not occurring, and 1 means the system is in the fault mode. Each alarm represents a binary variable as well. When a new alarm goes on, the decision logic algorithm performs an elimination process in the first step. In this step, fault modes exonerated by newly activated alarms are removed from the set of probable fault hypotheses. For example, when rb2 goes on, $f_2$ is therefore not the fault mode. Therefore, the decision logic algorithm removes this fault from the set of possible fault candidates. For the remaining fault hypotheses, the likelihoods of fault hypotheses are updated using a Bayesian reasoning method.

Figure 8:
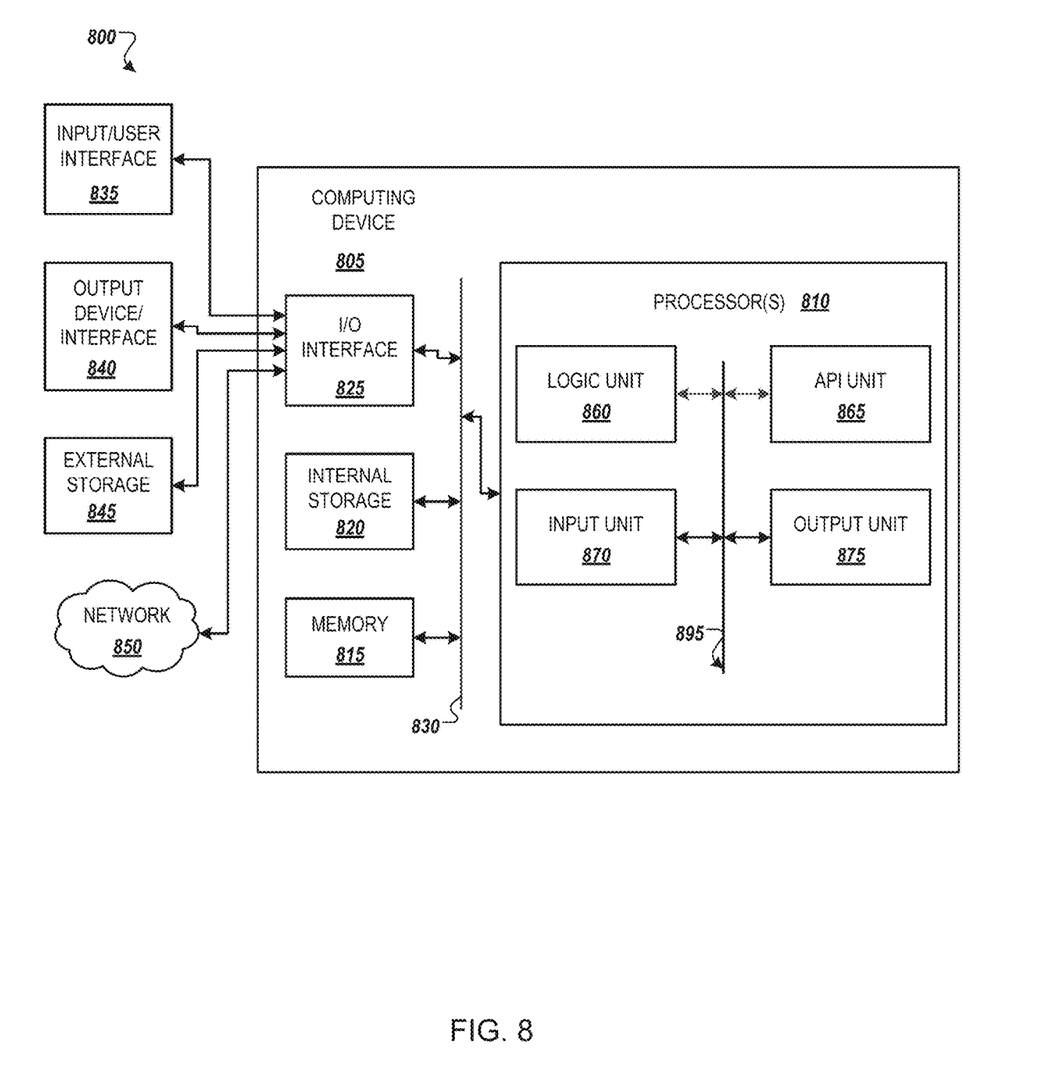
FIG. 8 illustrates an example computing environment with an example computer device suitable for use in some example implementations.

FIG. 8 illustrates an example computing environment with an example computer device suitable for use in some example implementations, such as an apparatus configured to manage a database of data involving a plurality of variables as described herein. Computer device 805 in computing environment 800 can include one or more processing units, cores, or processors 810, memory 815 (e.g., RAM, ROM, and/or the like), internal storage 820 (e.g., magnetic, optical, solid state storage, and/or organic), and/or IO interface 825, any of which can be coupled on a communication mechanism or bus 830 for communicating information or embedded in the computer device 805. IO interface 825 is also configured to receive images from cameras or provide images to projectors or displays, depending on the desired implementation.

Computer device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via IO interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

IO interface 825 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided. Processor(s) 810 can be in the form of hardware processors such as central processing units (CPUs) or in a combination of hardware and software units.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, input unit 870, output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide output based on the calculations described in example implementations. Processor(s) 810 can be configured to, for each of the plurality of variables, extract one or more minimal analytical redundancy relationships (ARRs) for the each of the plurality of variables from a subset of other ones of the plurality of variables; derive one residual for each of the one or more minimal ARRs; determine one or more boundaries of normal data for the each of the one or more ARRs from the database of the data; and determine a subset of the one or more residuals based on the one or more boundaries of the normal data to facilitate fault detection as described with respect to the data-driven ARR generation implementations herein.

Processor(s) 810 can be configured to extract the one or more minimal ARRs for the each of the plurality of variables from the subset of the other ones of the plurality of variables by: a) determining an estimation score for each of the other ones of the plurality of variables; b) adding a variable of the other ones of the plurality of variables to the one or more minimal ARRs; and c) iterating a) and b) for remaining ones of the other ones of the plurality of variables until an accuracy score of the one or more minimal ARRs reaches a threshold, as described with respect to the forward feature selection implementation described herein.

Processor(s) 810 can be configured to extract the one or more minimal ARRs for the each of the plurality of variables from the subset of the other ones of the plurality of variables by: a) determining whether one or more of the other ones of the plurality of variables can be used to estimate said each of the plurality of variables based on machine learning; b) for the one or more of the other ones of the plurality of variables that can be used to estimate said each of the plurality of variables based on machine learning, iteratively determining whether different subsets of the one or more of the other ones of the plurality of variables can be used to estimate said each of the plurality of variables based on the machine learning; and c) selecting ones of the different subsets that can be used to estimate said each of the plurality of variables as the one or more minimal ARRs if none of their subsets of the one or more of the other ones of the plurality of variables can be used to estimate said each of the plurality of variables as described with respect to the exhaustive search implementations herein.

Processor(s) 810 can be configured to facilitate fault detection with the subset of the one or more residuals, the facilitating fault detection by applying a hypothesis test on the subset of the one or more residuals, and detecting fault candidates from the output of the hypothesis test on data received for the subset of the one or more residuals as described herein with respect ot the example fault detection implementations and as shown in FIGS. 5 and 6.

Processor(s) 810 can be configured to conduct fault isolation on the fault candidates through applying a diagnosis reference model involving a bipartite graph configured to determine causal relations between residuals and the fault candidates as illustrated in FIG. 7 and as described with respect to the fault isolation implementations herein.

Processor(s) 810 can be configured to extract the minimal analytical redundancy relationship (ARR) for the each of the plurality of variables from the subset of the other ones of the plurality of variables is based on capturing delay on the data involving the subset of the other ones of the plurality of variables based on one of using time windows or recurrent neural networks (RNNs) to capture historical data of the data involving the subset of the other ones of the plurality of variables as described with respect to the implementations involving capturing delay through RNN or windows and as illustrated in FIG. 5.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a computer storage database of data involving a plurality of variables, the method comprising:
   for each of the plurality of variables:
      extracting, by a processor, one or more minimal analytical redundancy relationships (ARRs) for the each of the plurality of variables from a subset of other ones of the plurality of variables;
      deriving, by the processor, one residual for each of the one or more minimal ARRs;
      determining, by the processor, one or more boundaries of normal data for the each of the one or more ARRs from the computer storage database of the data;
      determining, by the processor, a subset of the one or more residuals based on the one or more boundaries of the normal data to facilitate fault detection; and
      isolating, by the processor, detected faults within the computer storage database of data based at least on the determined subset of the one or more residuals.

2. The method of claim 1, wherein the extracting the one or more minimal ARRs for the each of the plurality of variables from the subset of the other ones of the plurality of variables comprises:
   a) determining an estimation score for each of the other ones of the plurality of variables;
   b) adding a variable of the other ones of the plurality of variables to the one or more minimal ARRs; and
   c) iterating a) and b) for remaining ones of the other ones of the plurality of variables until an accuracy score of the one or more minimal ARRs reaches a threshold.

3. The method of claim 1, wherein the extracting the one or more minimal ARRs for the each of the plurality of variables from the subset of the other ones of the plurality of variables comprises:
   a) determining whether one or more of the other ones of the plurality of variables can be used to estimate said each of the plurality of variables based on machine learning;
   b) for the one or more of the other ones of the plurality of variables that can be used to estimate said each of the plurality of variables based on machine learning, iteratively determining whether different subsets of the one or more of the other ones of the plurality of variables can be used to estimate said each of the plurality of variables based on the machine learning; and
   c) selecting ones of the different subsets that can be used to estimate said each of the plurality of variables as the one or more minimal ARRs if none of their subsets of the one or more of the other ones of the plurality of variables can be used to estimate said each of the plurality of variables.

4. The method of claim 1, further comprising facilitating fault detection with the subset of the one or more residuals, the facilitating fault detection comprising:
   applying a hypothesis test on the subset of the one or more residuals, and
   detecting fault candidates from the output of the hypothesis test on data received for the subset of the one or more residuals.

5. The method of claim 4, further comprising conducting fault isolation on the fault candidates through applying a diagnosis reference model comprising a bipartite graph configured to determine causal relations between residuals and the fault candidates.

6. The method of claim 1, wherein the extracting the minimal analytical redundancy relationship (ARR) for the each of the plurality of variables from the subset of the other ones of the plurality of variables is based on capturing delay on the data involving the subset of the other ones of the plurality of variables based on one of using time windows or recurrent neural networks (RNNs) to capture historical data of the data involving the subset of the other ones of the plurality of variables.

7. A non-transitory computer readable medium, storing instructions for management of a database of data involving a plurality of variables, the instructions, when executed by one or more processors, execute a process comprising:
   for each of the plurality of variables:
      extracting one or more minimal analytical redundancy relationships (ARRs) for the each of the plurality of variables from a subset of other ones of the plurality of variables;
      deriving one residual for each of the one or more minimal ARRs;
      determining one or more boundaries of normal data for the each of the one or more ARRs from the database of the data;
      determining a subset of the one or more residuals based on the one or more boundaries of the normal data to facilitate fault detection; and
      isolating detected faults within the database of data based at least on the determined subset of the one or more residuals.

8. The non-transitory computer readable medium of claim 7, wherein the extracting the one or more minimal ARRs for the each of the plurality of variables from the subset of the other ones of the plurality of variables comprises:
   a) determining an estimation score for each of the other ones of the plurality of variables;
   b) adding a variable of the other ones of the plurality of variables to the one or more minimal ARRs; and
   c) iterating a) and b) for remaining ones of the other ones of the plurality of variables until an accuracy score of the one or more minimal ARRs reaches a threshold.

9. The non-transitory computer readable medium of claim 7, wherein the extracting the one or more minimal ARRs for the each of the plurality of variables from the subset of the other ones of the plurality of variables comprises:

a) determining whether one or more of the other ones of the plurality of variables can be used to estimate said each of the plurality of variables based on machine learning;

b) for the one or more of the other ones of the plurality of variables that can be used to estimate said each of the plurality of variables based on machine learning, iteratively determining whether different subsets of the one or more of the other ones of the plurality of variables can be used to estimate said each of the plurality of variables based on the machine learning; and c) selecting ones of the different subsets that can be used to estimate said each of the plurality of variables as the one or more minimal ARRs if none of their subsets of the one or more of the other ones of the plurality of variables can be used to estimate said each of the plurality of variables.

10. The non-transitory computer readable medium of claim 7, the instructions further comprising facilitating fault detection with the subset of the one or more residuals, the facilitating fault detection comprising:
applying a hypothesis test on the subset of the one or more residuals, and
detecting fault candidates from the output of the hypothesis test on data received for the subset of the one or more residuals.

11. The non-transitory computer readable medium of claim 10, further comprising conducting fault isolation on the fault candidates through applying a diagnosis reference model comprising a bipartite graph configured to determine causal relations between residuals and the fault candidates.

12. The non-transitory computer readable medium of claim 7, wherein the extracting the minimal analytical redundancy relationship (ARR) for the each of the plurality of variables from the subset of the other ones of the plurality of variables is based on capturing delay on the data involving the subset of the other ones of the plurality of variables based on one of using time windows or recurrent neural networks (RNNs) to capture historical data of the data involving the subset of the other ones of the plurality of variables.

13. An apparatus, configured to manage a computer storage database of data involving a plurality of variables, the apparatus comprising:
a processor, configured to, for each of the plurality of variables:
extract one or more minimal analytical redundancy relationships (ARRs) for the each of the plurality of variables from a subset of other ones of the plurality of variables;
derive one residual for each of the one or more minimal ARRs;
determine one or more boundaries of normal data for the each of the one or more ARRs from the computer storage database of the data;
determine a subset of the one or more residuals based on the one or more boundaries of the normal data to facilitate fault detection; and
isolate detected faults within the computer storage database of data based at least on the determined subset of the one or more residuals.

14. The apparatus of claim 13, wherein the processor is configured to extract the one or more minimal ARRs for the each of the plurality of variables from the subset of the other ones of the plurality of variables by:
a) determining an estimation score for each of the other ones of the plurality of variables;
b) adding a variable of the other ones of the plurality of variables to the one or more minimal ARRs; and
c) iterating a) and b) for remaining ones of the other ones of the plurality of variables until an accuracy score of the one or more minimal ARRs reaches a threshold.

15. The apparatus of claim 13, wherein the processor is configured to extract the one or more minimal ARRs for the each of the plurality of variables from the subset of the other ones of the plurality of variables by:
a) determining whether one or more of the other ones of the plurality of variables can be used to estimate said each of the plurality of variables based on machine learning;
b) for the one or more of the other ones of the plurality of variables that can be used to estimate said each of the plurality of variables based on machine learning, iteratively determining whether different subsets of the one or more of the other ones of the plurality of variables can be used to estimate said each of the plurality of variables based on the machine learning; and
c) selecting ones of the different subsets that can be used to estimate said each of the plurality of variables as the one or more minimal ARRs if none of their subsets of the one or more of the other ones of the plurality of variables can be used to estimate said each of the plurality of variables.

16. The apparatus of claim 13, wherein the processor is further configured to facilitate fault detection with the subset of the one or more residuals, the facilitating fault detection by:
applying a hypothesis test on the subset of the one or more residuals, and
detecting fault candidates from the output of the hypothesis test on data received for the subset of the one or more residuals.

17. The apparatus of claim 16, the processor further configured to conduct fault isolation on the fault candidates through applying a diagnosis reference model comprising a bipartite graph configured to determine causal relations between residuals and the fault candidates.

18. The apparatus of claim 13, wherein the processor is configured to extract the minimal analytical redundancy relationship (ARR) for the each of the plurality of variables from the subset of the other ones of the plurality of variables is based on capturing delay on the data involving the subset of the other ones of the plurality of variables based on one of using time windows or recurrent neural networks (RNNs) to capture historical data of the data involving the subset of the other ones of the plurality of variables.

* * * * *